United States Patent
Kumar et al.

(10) Patent No.: US 12,419,329 B1
(45) Date of Patent: Sep. 23, 2025

(54) COMPOSITIONS AND METHODS OF USING A NOVEL ANIMAL FEED

(71) Applicant: Louis Dreyfus Company Plant Proteins LLC, Livermore, CA (US)

(72) Inventors: Manoj Kumar, Livermore, CA (US); Prasanth Kumar Sasidharan Pillai, Livermore, CA (US)

(73) Assignee: Louis Dreyfus Company Plant Proteins LLC, Livermore, CA (US)

( * ) Notice: Subject to any disclaimer, the term of this patent is extended or adjusted under 35 U.S.C. 154(b) by 0 days.

(21) Appl. No.: 18/744,467

(22) Filed: Jun. 14, 2024

Related U.S. Application Data

(63) Continuation of application No. 18/614,150, filed on Mar. 22, 2024.

(51) Int. Cl.
| | | |
|---|---|---|
| A23K 10/30 | (2016.01) | |
| A23K 20/147 | (2016.01) | |
| A23K 50/10 | (2016.01) | |

(52) U.S. Cl.
CPC ............ *A23K 10/30* (2016.05); *A23K 20/147* (2016.05); *A23K 50/10* (2016.05)

(58) Field of Classification Search
CPC ....... A23K 10/30; A23K 20/147; A23K 50/10
USPC .......................................................... 426/2
See application file for complete search history.

(56) References Cited

U.S. PATENT DOCUMENTS

| | | | |
|---|---|---|---|
| 3,991,218 | A | 11/1976 | Earle et al. |
| 4,349,578 | A | 9/1982 | Wright et al. |
| 2021/0274809 | A1 | 9/2021 | Kraayenbrink et al. |
| 2022/0015387 | A1 | 1/2022 | Zhang et al. |
| 2022/0071234 | A1 | 3/2022 | Delporte et al. |

FOREIGN PATENT DOCUMENTS

| | | | | |
|---|---|---|---|---|
| CA | 2757067 | A1 | 9/2010 | |
| CN | 104857125 | A | 8/2015 | |
| CN | 106036085 | A * | 10/2016 | |
| CN | 109170260 | A | 1/2019 | |
| CN | 111280128 | A | 6/2020 | |
| ES | 2663790 | T3 * | 4/2018 | ............ A23L 11/09 |
| JP | H0698690 | A | 11/2024 | |
| KR | 2005075523 | A | 7/2005 | |
| KR | 2020016044 | A | 2/2020 | |
| RU | 2398444 | C2 | 9/2010 | |
| WO | WO 2000-036928 | A1 | 6/2000 | |
| WO | WO-0036928 | A1 * | 6/2000 | ........... A23K 20/158 |

OTHER PUBLICATIONS

NPL Pea soluble fiber (Sep. 26, 2019). (Year: 2019).*
Elliott, et al. (in AU 2007200743 A1 (Machine Translation is attached as NPL document). (Year: 2007).
Anonymous; "What's so special about yellow pea fiber?"; bellycrush; retrieved on Aug. 5, 2024, pp. 1-5 (Sep. 26, 2019).
Bonnardeaux, et al.; "Uses for canola meal"; Department of Primary Industries and Regional Development, Western Australia, Perth. Report, pp. 1-16 (Jan. 2007).
Cotta, et al.; "Effect of Peptides and Amino Acids on Efficiency of Rumen Bacterial Protein Synthesis in Continuous Culture"; Journal of Dairy Science; vol. 65, No. 2, pp. 226-234 (Feb. 1982).
Gilbery, et al.; "Effect of field peas, chickpeas, and lentils on rumen fermentation, digestion, microbial protein synthesis, and feedlot performance in receiving diets for beef cattle"; Journal of Animal Science; vol. 85, No. 11, pp. 3045-3053 (Nov. 2007).
Google Search; "Canola meal"; google; retrieved on Aug. 5, 2024, pp. 1-2 (2024).
Hall, et al.; "Nutrient synchrony: Sound in theory, elusive in practice"; Journal of Animal Science; vol. 86, No. suppl_14, pp. E287-E292 (Apr. 2008).
Joy, et al.; "Effect of dietary lipid inclusion from by-product-based pellets on dry matter intake, ruminal fermentation, and nutrient digestion in finishing beef heifers"; Canadian Journal of Animal Science; vol. 101, No. 3, pp. 481-492 (Sep. 2021).
Nair, et al.; "Evaluation of canola meal derived from *Brassica juncea* and *Brassica napus* on rumen fermentation and nutrient digestibility by feedlot heifers fed finishing diets"; Canadian Journal of Animal Science; vol. 96, No. 3, pp. 342-353 (Sep. 2016).
Nair, et al.; "Evaluation of canola meal derived from *Brassica juncea* and *Brassica napus* seed as an energy source for feedlot steers"; Canadian Journal of Animal Science; vol. 95, No. 4, pp. 599-607 (Dec. 2015).
Zhang, et al.; "Quantifying Nutrient Budgets for Sustainable Nutrient Management"; Global Biogeochemical Cycles; vol. 34, No. 3, e2018GB006060, pp. 1-25 (Mar. 2020).
Bien et al.; Abstract—J. Animal Sci 101 (Suppl. 3) pp. 366-367 (Year: 2023).
Heuze et al., Soybean meal, Feedipedia, a programme by INRAE, CIRAD, AFZ and FAO, Mar. 4, 2020 [Retrieved on Apr. 24, 2025]. <URL: https://feedipedia.org/node/674>.

* cited by examiner

*Primary Examiner* — Erik Kashnikow
*Assistant Examiner* — Bhaskar Mukhopadhyay
(74) *Attorney, Agent, or Firm* — Edward J. Baba; Andrew R. Guzman; Bozicevic, Field & Francis LLP

(57) ABSTRACT

The present invention provides an animal feed additive comprising pea solubles, in particular pea solubles added to canola meal. The present invention further provides methods of reducing the percentage of methane in the gas produced in an animal, in particular a ruminant animal. In addition, methods are provided for improving crude protein and dry matter digestibility in an animal, in particular a ruminant animal.

7 Claims, No Drawings

COMPOSITIONS AND METHODS OF USING A NOVEL ANIMAL FEED

BACKGROUND OF THE INVENTION

Gases that trap heat in the atmosphere are called greenhouse gases. Carbon dioxide and methane are the principal greenhouse gases contributing to our increasingly warm planet, and the impact of these gases are increasingly appreciated. Among these, methane is the worst of the lot, because although it persists in the atmosphere for a much shorter period of time, the warming impact of methane is much more powerful and long lasting. In fact, as a greenhouse gas, methane is 28-times more powerful than CO2 on a 100-year timescale and 80-times more powerful over 20 years. A major source of methane in the atmosphere is animals, particularly, ruminant animals. When the ruminating animal digests its food, it gets processed in their systems by fermentation that produces methane as a byproduct expelled into the atmosphere by the animal by natural biological processes. For instance, a single cow produces from 154 to 264 pounds of methane gas per year. Not counting the emissions of any other livestock, 1.5 billion cattle, raised specifically for meat production worldwide, emit at least 231 billion pounds of methane into the atmosphere each year (Our World in Data). Therefore, to keep our planet from further global warming, there is an urgent need for curbing the production of methane from these ruminating animals. Although there are chemical additives and lab grown chemical additives that are available to reduce methane emissions from animals, there is a growing need for a natural, more effective additive to reduce cost and provide a natural solution to this growing problem.

Pulse grains, including peas, have been reported to improve growth and production performance when added to the diets of sheep and dairy and beef cattle. Pea protein is a popular plant protein source for the food industry. The processing of peas for protein production results in a byproduct of solubles after precipitation of protein in the protein isolation process. When concentrated (often referred to as pea molasses), this soluble byproduct has found industrial applications as a binder. However, utilization in the animal feed industry has not been tested.

Canola meal is a major product in the processing of canola for oil. Canola meal has been utilized as a feed component for livestock and, as an additive to feed preparations, has been reported to improve the nutrient utilization and growth performance of beef cattle. However, canola meal has been shown to have a lower energy value than cereal grain such as barley. Thus, there is a need to improve the nutritional utilization of canola meal, an abundant and relatively cheap food source, particularly in livestock feed.

SUMMARY OF THE INVENTION

The present invention provides an animal feed additive comprising pea solubles, in particular pea solubles added to canola meal. The inventors have shown that the addition of pea solubles improves digestibility, resulting in greater nutritional utilization of the canola meal. In addition, the inventors have shown that, surprising, the addition of pea solubles to canola meal also decreases the ratio of methane to other gases produced during digestion of the canola meal. In some embodiments, an animal feed comprising the animal feed additive is provided. In some embodiments, the present invention provides methods of reducing the percentage of methane in the gas produced in an animal, in particular a ruminant animal, more particularly cattle, the method comprising providing to the animal's digestive tract an effective amount of pea solubles. The pea solubles may be in the form of an animal feed additive or an animal feed comprising such an animal feed additive. Methods of reducing methane emissions from a ruminating animal by administering to the ruminating animal an animal feed mixed with an effective amount of an animal feed additive are also disclosed. Further methods are provided for improving dry matter digestibility in an animal, in particular a ruminant animal, more particularly cattle, the method comprising providing to the animal's digestive tract an effective amount of pea solubles. Yet further methods are provided for improving crude protein digestibility in an animal, in particular a ruminant animal, more particularly cattle, the method comprising providing to the animal's digestive tract an effective amount of pea solubles. Methods for increasing the pH in the digestive tract of an animal, in particular a ruminant animal, more particularly cattle, are also provided, the methods comprising providing to the animal's digestive tract an effective amount of pea solubles. In each case of these methods, the pea solubles may be in the form of an animal feed additive or an animal feed comprising such an animal feed additive. The pea solubles may be in the form of an animal feed additive or an animal feed comprising such an animal feed additive.

DETAILED DESCRIPTION OF THE INVENTION

Compositions are provided for use as an animal feed additive, along with methods of using the compositions for reducing methane emissions. The inventors surprisingly found that the animal feed additive, as disclosed herein, has a great potential for use as an animal feed additive in order to essentially reduce the percentage of methane in the gas produced by an animal without affecting microbial fermentation in a way that would be detrimental to the host animal. Other advantages that come with using the composition as claimed, include increased rumen pH, improving an anaerobic environment for more effective digestibility of the feed, in particular the canola meal component of animal feed, specifically enhancing crude protein digestibility and dry matter digestibility of the animal. The composition of the feed additive is a nature-derived composition that comprises pea solubles, a byproduct of pea protein processing. Proportions of each of these components for reducing the percentage of methane in gases produced by a ruminating animal is also disclosed. Further uses of this novel composition comprising a portion of canola meal and a portion of pea solubles for increasing digestibility of a feed for ruminants and increasing the rumen pH are also provided.

Before the present composition and methods of its uses are described, it is to be understood that this invention is not limited to the particular methods or compositions described, which may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and preferred methods and materials are now described. All publications mentioned herein are incorporated herein by reference to disclose and describe the methods and/or materials in connection with which the publications are cited. It is understood that the present disclosure supersedes any disclosure of an incorporated publication to the extent there is a contradiction.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

It is appreciated that certain features of the methods and compositions, which are, for clarity, described in the context of separate embodiments, may also be provided in combination in a single embodiment. Conversely, various features of the methods and compositions, which are, for brevity, described in the context of a single embodiment, may also be provided separately or in any suitable sub-combination. All combinations of the embodiments are specifically embraced by the present disclosure and are disclosed herein just as if each and every combination was individually and explicitly disclosed, to the extent that such combinations embrace operable processes and/or compositions. In addition, all sub-combinations listed in the embodiments describing such variables are also specifically embraced by the present methods and compositions and are disclosed herein just as if each such sub-combination was individually and explicitly disclosed herein.

Unless otherwise indicated, descriptions of composition component content, such as protein content, shall be considered as being on a dry basis ("db"). Animal feed component compositions, such as canola meal content or peas solubles content, shall be considered as being on a dry matter basis ("DM basis"), to be used interchangeably with dry basis ("db"). As is known in the art, moisture content varies considerably between feeds contributing to the as fed weight, therefore it is important to convert values to a dry matter basis, which is the feed contents remaining once the moisture has been taken out.

As will be apparent to those of skill in the art upon reading this disclosure, each of the individual embodiments described and illustrated herein has discrete components and features which may be readily separated from or combined with the features of any of the other several embodiments without departing from the scope or spirit of the present methods. Any recited method can be carried out in the order of events recited or in any other order that is logically possible.

Definitions

The term "about", particularly in reference to a given quantity, is meant to encompass deviations of plus or minus five percent.

"Extracting" or "extraction" means the removal or separation of one or more component(s) of a multicomponent composition. The concept of extracting a protein isolate from a seed protein flour is well known in the present art.

"Effective amount" means a dosage sufficient to produce a desired result, e.g., an amount sufficient to effect beneficial or desired results, such as the reduction in methane production as compared to a control.

Production of Canola Meal from Canola Seed

Production of canola meal is well known in the art. For the examples provided herein, the canola oil seed was processed using solvent extraction to separate the oil from the meal. The cleaned oil seed, after seed preconditioning and flaking, was pressed at high temperature to mechanically remove a portion of the oil, then the cake was further extracted with hexane to remove the remainder of the oil. The deoiled cake was desolventized, toasted, dried, and cooled to produce the canola meal.

Extracting Pea Solubles

Milled pea flour was treated at alkaline conditions to solubilize the protein fraction, which was further separated into protein rich supernatant and starch rich pellet via solid-liquid separation method. The protein rich supernatant (obtained in the previous step) was further purified by isoelectric precipitation and separated via solid-liquid separation method to yield a protein rich pellet (PPI) and protein light supernatant ("pea solubles"). The pea solubles (<5% solids) was concentrated by filtration and/or evaporation to achieve a minimum solid content of 45%. This concentrated pea soluble is used to blend with canola meal. The concentrated pea solubles may also be referred to as pea molasses.

Animal Feed Additive and Modified Animal Feed

Presented herein are, in one aspect, is an animal feed additive. Animal feed additive is understood to be a composition that is co-fed or admixed with animal feed. The animal feed additive comprises pea solubles, in particular in combination with canola meal. The animal feed additive comprises as little as 0.1% pea solubles on a dry basis, but may comprise at least 1% pea solubles, 0.15% pea solubles, 0.2%, 0.3%, 0.4% or 0.5% pea solubles. In other embodiments the animal feed additive comprises at least 0.6%, 0.7%, 0.8%, 0.9% or 1% pea solubles, In other embodiments, the animal feed additive comprises at least 1.5%, 2%, 2.5%, 3%, 3.5%, 4%, 4.5%, 5%, 5.5%, 6%, 6.5%, 7%, 7.5%, 8%, 8.5%, 9% or 9.5% pea solubles. In yet other embodiments, the animal feed additive comprises at least 10% pea solubles.

In certain aspects of the invention, an animal feed additive comprises pea solubles and canola meal. The animal feed additive comprises as much as 98% canola meal. In other embodiments, the animal feed additive comprises at least 97%, 96%, 95%, 94%, 93%, 92%, 91% or 90% canola meal. In other embodiments, the animal feed additive comprises at least 89%, 88%, 87%, 86%, 85%, 84% 83%, 82% 81% or 80% canola meal. In yet other embodiments, the animal feed additive comprises at least 79%, 78%, 77%, 76%, 75%, 74%, 73%, 72% 71% or 70% canola meal.

In certain embodiments, the composition of the animal feed additive further comprises a mineral premix, a vitamin premix including vitamins and minerals. In some embodiments, the composition of the animal feed additive, further comprises at least one fat-soluble vitamin, a water-soluble vitamin, a trace mineral, and/or a micro mineral.

The following are non-exclusive lists of examples of these further components of the feed of the animal:

Examples of fat-soluble vitamins are vitamin A, vitamin D3, vitamin E, and vitamin K, e.g. vitamin K3.

Examples of water-soluble vitamins are vitamin B12, biotin and choline, vitamin B1, vitamin B2, vitamin B6, niacin, folic acid and panthothenate, e.g., Ca-D-panthothenate. Examples of trace minerals are manganese, zinc, iron, copper, iodine, selenium, and cobalt.

Examples of micro minerals are calcium, phosphorus and sodium.

In some embodiments, the composition of the animal feed additive is included in a bolus that is placed in the rumen.

In some embodiments, the animal is a ruminating animal. Ruminating mammals according to the present invention include cattle, goats, sheep, giraffes, American Bison, European bison, yaks, water buffalo, deer, camels, alpacas, llamas, wildebeest, antelope, pronghorn, donkeys, elephants and nilgai. For all embodiments of the present invention, domestic cattle, sheep and goat are the more preferred species of particular interest, due to their prevalence and value in the livestock business. In some preferred embodiments, steers and heifers are the most preferred ruminating animals.

Animal Feed

Feed composition for ruminating animals, such as cows, is usually composed of an easily degradable fraction (named concentrate) and a fiber-rich less readily degradable fraction (named hay, forage, or roughage).

Hay is made of dried grass, legumes, or other herbaceous plants that have been cut and dried for ruminant feed. Grasses include, among others, orchard grass, bluegrass, bermudagrass, timothy, ryegrass and, fescues. Legumes include among others alfalfa (lucerne), clover, peas, beans and vetches. Other forage crops include sugarcane, kales, rapes, and cabbages. Also root crops such as turnips, swedes, mangles, fodder beet, and sugar beet (including sugar beet pulp and beet molasses) are used to feed ruminants. Still further crops are tubers such as potatoes, cassava and sweet potato. Silage is an ensiled version of the fiber-rich fraction (e.g. from grasses, legumes or whole cereals) whereby material with a high water content is treated with a controlled anaerobic fermentation process (naturally-fermented or additive treated).

Concentrate is largely made up of cereals (such as barley including brewers grain and distillers grain, maize, wheat, sorghum), but also often contain protein-rich feed ingredients such as soybean, rapeseed, palm kernel, cotton seed and sunflower.

In some embodiments of the invention, animal feed comprising the animal feed additives described above are provided. In certain embodiments, the animal feed additive is 10% of the animal feed comprising animal feed additive. In other embodiments, the animal feed additive is at least 1%, 20%, 3%, 4%, 5%, 6%, 7%, 8% or 9% of the animal feed comprising animal feed additive. In other embodiments, the animal feed additive is at least 11%, 12%, 13%, 14%, 15%, 16%, 17%, 18%, 19% or 20% of the animal feed comprising animal feed additive.

Methods of Reducing Percentage Methane Production

Aspects, including embodiments, of the present disclosure include methods of reducing percentage methane production by animals, the methods comprising providing the animal's digestive tract an effective amount of pea solubles, in particular a composition comprising pea solubles and canola meal. Such providing comprises adding pea solubles to the feed of the animal, typically in combination with canola meal. In certain embodiments, the pea solubles, in particular in combination with canola meal, is in the form of an animal feed additive. In some embodiments, the animal feed additives are those described above. In some embodiments, the percentage of methane in gasses produced by an animal is partially or substantially reduced.

In some embodiments, the percent of methane as a percent of total gas produced by the animal is reduced by at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%. In some preferred embodiments, the percentage of methane production by the animal is reduced by at least 10% when the animal is fed the animal feed additive composition mixed with the animal feed provided to the animal ad libitum.

Exemplary Non-limiting Aspects of the Disclosure

Aspects, including embodiments, of the present subject matter described above may be beneficial alone or in combination, with one or more other aspects or embodiments. Without limiting the foregoing description, certain non-limiting aspects of the disclosure numbered 1-60 are provided below. As will be apparent to those of skill in the art upon reading this disclosure, each of the individually numbered aspects may be used or combined with any of the preceding or following individually numbered aspects. This is intended to provide support for all such combinations of aspects and is not limited to combinations of aspects explicitly provided below:

1. An animal feed additive comprising pea solubles.
2. The animal feed additive of aspect 1, comprising at least 0.1% (db) pea solubles.
3. The animal feed additive of aspect 1, comprising at least 0.15% (db) pea solubles.
4. The animal feed additive of aspect 1, comprising at least 0.5% (db) pea solubles.
5. The animal feed additive of aspect 1, comprising at least 1% (db) pea solubles.
6. The animal feed additive of aspect 1, comprising at least 5% (db) pea solubles.
7. The animal feed additive of aspect 1, comprising at least 10% (db) pea solubles.
8. The animal feed additive of aspect 1, comprising at least 80%, on a dry basis (db) of canola meal.
9. The animal feed additive of aspect 1, comprising at least 90% (db) canola meal and at least 1% (db) pea solubles.
10. The animal feed additive of aspect 1, comprising at least 95% canola meal (db) and about 1.5% pea solubles (db).
11. The animal feed additive of aspect 1, comprising at least 98.5% canola meal (db) and about 1.5% pea solubles (db).
12. An animal feed comprising the animal feed additive of any one of aspects 1-11.

13. The animal feed of aspect 12, wherein the feed is 10% additive on a dry matter basis.
14. A method of reducing percentage of methane in the gas produced by an animal's digestive tract comprising providing said animal with an effective amount of animal feed comprising pea solubles.
15. The method of aspect 14, wherein said providing comprises adding pea solubles to the feed of said animal.
16. The method of aspect 15, wherein the pea solubles is in the form of an animal feed additive comprising pea solubles.
17. The method of aspect 16, wherein the animal feed additive is any one of the animal feed additives of aspects 1-11.
18. A method of improving dry matter digestibility in an animal's digestive tract comprising providing said animal with an effective amount of animal feed comprising pea solubles.
19. The method of aspect 18, wherein said providing comprises adding pea solubles to the feed of said animal.
20. The method of aspect 19, wherein the pea solubles is in the form of an animal feed additive.
21. The method of aspect 20, wherein the animal feed additive is any one of the animal feed additives of aspects 1-11.
22. A method of improving crude protein digestibility in an animal comprising providing the animal's digestive tract with an effective amount of pea solubles.
23. The method of aspect 22, wherein said providing comprises adding pea solubles to the feed of said animal.
24. The method of aspect 23, wherein the pea solubles is in the form of an animal feed additive.
25. The method of aspect 24, wherein the animal feed additive is any one of the animal feed additives of aspects 1-11.
26. A method of increasing the rumen pH in a ruminent animal comprising providing said animal tract with an effective amount of animal feed comprising pea solubles.
27. The method of aspect 26, wherein said providing comprises adding pea solubles to the feed of said animal.
28. The method of aspect 27, wherein the pea solubles is in the form of an animal feed additive.
29. The method of aspect 28, wherein the animal feed additive is any one of the animal feed additives of aspects 1-11.
30. A method of reducing the percentage of methane in the gas produced by an animal comprising feeding an animal the animal feed of aspect 12 or 13.
31. A method of improving dry matter digestibility in an animal comprising feeding an animal the animal feed of aspect 12 or 13.
32. A method of improving crude protein digestibility in an animal comprising feeding an animal the animal feed of Aspect 12 or 13.
33. A method of increasing the rumen pH in a ruminant animal comprising feeding an animal the animal feed of Aspect 12 or 13.
34. The method of any one of aspects 14-33, wherein the animal is a ruminating animal.
35 The method of aspect 34, wherein the ruminating animal is chosen from the group consisting of cattle, goats, sheep, lamb, giraffes, American Bison, European bison, yaks, water buffalo, deer, camels, alpacas, llamas, wildebeest, antelope, pronghorn, donkeys, elephants and nilgai.
36. The method of aspect 34, wherein the ruminating animal is a cattle chosen from cows, bulls, heifers and steers.
37. A method of increasing the usable nutrients for an animal fed canola meal comprising, adding an effective amount of pea solubles to said canola meal.
38. The method of aspect 37, wherein at least 0.1% (db) pea solubles is added to said canola meal.
39. The method of aspect 37, wherein at least 0.15% (db) pea solubles is added to said canola meal.
40. The method of aspect 37, wherein at least 0.5% (db) pea solubles is added to said canola meal.
41. The method of aspect 37, wherein at least 1% (db) pea solubles is added to said canola meal.
42. The method of aspect 37, wherein at least 5% (db) pea solubles is added to said canola meal.
43. The method of aspect 37, wherein at least 10% (db) pea solubles is added to said canola meal.
44. The method of any one of aspects 37-43, said canola meal is added to the feed of said animal.
45. The method of aspect 44, wherein the canola meal is in the form of an animal feed additive.
46. The method of aspect 45, wherein the animal feed additive is any one of the animal feed additives of aspects 8-11.
47. A method of reducing percentage of methane in the gas produced by an animal fed canola meal comprising, adding an effective amount of pea solubles to said canola meal.
48. A method of improving dry matter digestibility in an animal fed canola meal comprising, adding an effective amount of pea solubles to said canola meal.
49. A method of improving crude protein digestibility in an animal fed canola meal comprising, adding an effective amount of pea solubles to said canola meal.
50. A method of increasing the pH in the digestive tract of an animal fed canola meal comprising, adding an effective amount of pea solubles to said canola meal.
51. The method of any one of aspects 47-50, wherein at least 0.1% (db) pea solubles is added to said canola meal.
52. The method of any one of aspects 47-50, wherein at least 0.15% (db) pea solubles is added to said canola meal.
53. The method of any one of aspects 47-50, wherein at least 0.5% (db) pea solubles is added to said canola meal.
54. The method of any one of aspects 47-53, said canola meal is added to the feed of said animal.
55. The method of aspect 54, wherein the canola meal is in the form of an animal feed additive.
56. The method of aspect 55, wherein the animal feed additive is any one of the animal feed additives of aspects 8-10.
57. The method of any one of aspects 47-50 comprising feeding an animal the animal feed of Aspect 12 or 13.
58. The method of any one of aspects 37-57, wherein the animal is a ruminating animal.
59 The method of aspect 58, wherein the ruminating animal is chosen from the group consisting of cattle, goats, sheep, lamb, giraffes, American Bison, European bison, yaks, water buffalo, deer, camels, alpacas, llamas, wildebeest, antelope, pronghorn, and nilgai.

60. The method of aspect 59, wherein the ruminating animal is a cattle chosen from cows, bulls, heifers and steers.

EXAMPLES

The following examples are put forth to provide those of ordinary skill in the art with a complete disclosure and description of how to make and use the present invention and are not intended to limit the scope of what the inventors regard as their invention nor are they intended to represent that the experiments below are all or the only experiments performed. Efforts have been made to ensure accuracy with respect to numbers used (e.g., amounts, temperature, etc.) but some experimental errors and deviations should be accounted for. Unless indicated otherwise, parts are parts by weight, temperature is in degrees Centigrade, and times are in minutes.

All publications and patent applications cited in this specification are herein incorporated by reference as if each individual publication or patent application were specifically and individually indicated to be incorporated by reference.

The present invention has been described in terms of particular embodiments found or proposed by the present inventor to comprise preferred modes for the practice of the invention. It will be appreciated by those of skill in the art that, in light of the present disclosure, numerous modifications and changes can be made in the particular embodiments exemplified without departing from the intended scope of the invention. All such modifications are intended to be included within the scope of the appended claims.

Example 1A: In Vitro Test to Measure Methane Production and pH Effects

Materials and Methods: Canola meal and canola meal with 1.5% db pea solubles were ground to pass through a 1 mm screen. Three grams of each sample, ground and passed through the screen were put in replicate filter bags and put in 125 ml Ankom RF System glass jars.

Rumen fluid was collected from the ventral, anterior and posterior sacs of the rumen from two ruminally cannulated heifers. The collected rumen fluid was strained and flushed continuously with CO2. pH was measured using a pH meter and recorded.

15 ml of the rumen fluid was mixed with 45 ml of anaerobic buffer (buffer media prepared as per Goering and van Soest (1970)) and added to each glass jar containing the samples. The jars were incubated in a water bath at 39 C for 24 h. 5 treatments with 3 replicates per treatment were performed. Empty filter bags were used as blanks and dried distillers grains served as a standard.

Total gas production was measured at the end of 2, 4, 8, 16 and 24 h of incubation using the Ankom RF system. Methane was analyzed periodically as produced. Tedlar gas collection bags were used to collect methane and analyze methane content after 20 hours.

Samples of fermentation media were also collected at the end of 2, 4, 8, 16, and 24 h of incubation. At the end of 24 hours, fermentation was stopped by immersing the jars in ice. Upon opening the jars, the filter bags were removed and pH of the fermentation liquid was measured. Samples were taken and preserved from the filter bags and stored at −20° C. for the evaluation of volatile fatty acids (VFA), and ammonia-N($NH_3$—N). Samples were analysed for VFA and methane using gas chromatography and for ammonia as per methods described in Cotta and Russell, J. Dairy Sci. (1982) 65, pp. 226-34.

Results:

TABLE 1

Gas and methane production parameters of regular canola meal (CM) and CM + PMS after 24 hours of in vitro incubation

| | Treatments | | | |
|---|---|---|---|---|
| Item | CM | CM + PMs | SEM[2] | P-value |
| Total gas, mmol | 143.4 | 165.9 | 12.22 | 0.28 |
| Methane, % of total gas | 19.74 | 17.67 | 0.30 | <0.001 |

[1]Treatments included regular canola meal (CM) and CM + PMS.
[2]SEM, pooled standard error of mean (n = 3).

Mean pH of the fermentation liquid in the CM jars was 5.8, while the pH from the CM+pea soubles was 6.21.

Discussion

It is likely that blending PMS with CM at 1.5% inclusion (DM basis) resulted in an increased microbial fermentation, as indicated by the numerically greater total gas production. Further, the proportion (%) of $CH_4$ in the fermentation gas was lower for CM+PMS than for CM. The lower $CH_4$% and pH are likely due to improved ruminal microbial fermentation.

Example 1B: In Vitro Test to Analyze Crude Protein (CP) and Dry Matter (DM) Degradability At the end of 24 h of incubations described in Example 1A, the bags containing the samples were removed from the glass jars and rinsed in cold water for at least five times until the rinsed water was clear. The retrieved bags were then dried in an oven at 55 C for 48 h. The dried bags were weighed and the contents were analyzed for crude protein and dry matter degradability by the Leco method (method 990.03; AOAC 2000).

Results:

TABLE 2

Digestibility parameters of regular canola meal (CM) and CM + PMS after 24 h of in vitro incubation

| | Treatments[1] | | | |
|---|---|---|---|---|
| Item | CM | CM + PMS | SEM[2] | P-value |
| DM digestibility | 72.0% | 75.6% | 0.80 | <0.01 |
| CP digestibility | 70.5% | 74.5% | 0.90 | <0.01 |

[1]Treatments included regular canola meal (CM), CM blended with pea molasses (CM + PMS)
[2]SEM, pooled standard error of mean (n = 3).

Discussion

Blending PMS at a 1.5% (DM basis) level with CM resulted in improved DMD and CPD after 24 hours of in vitro incubation. Results indicate that improved protein-energy synchrony due to the oligosaccharides provided by PMS likely maximized active ammonia assimilation, improving the ruminal microbial fermentation.

Example 2: In Situ Test for Analyzing Crude Protein Degradability

Materials and Methods: The rate and extent of DM and CP disappearance of CM treatments was determined by in situ incubation of samples using three ruminally cannulated Angus heifers. All heifers were fed a diet containing 40% grass hay, 20% alfalfa hay, 25% dry rolled corn, 10% soybean meal, and 5% vitamin-mineral supplement (DM basis). Heifers were adapted to their diet for two weeks before the in-situ rumen incubation. All cattle were cared for as per the Institutional Animal Care and Use Committee protocol.

Canola meal and canola meal with 1.5% db pea solubles were ground to pass through a 1 mm screen. 5 g each of the ground CM samples were weighed into triplicate 5 cm×10 cm nylon bags (Ankom Technology, Macedon, NY) with a pore size of 50±10 µm. Bags were heat sealed and placed into a laundry bag and placed in the ventral sac of the rumen of each heifer for 0, 2, 4, 8, 16, and 24 h following a sequential all-out approach. The incubation started at 0800 on the day of sampling. After removal from the rumen, bags were immediately rinsed in cold water for five rinses or until the rinsed water was clear. Bags were dried in a forced air oven at 55° C. for 72 h. Residues remaining in triplicate bags at each time point were combined and used to measure CP.
Results:

TABLE 3

Digestibility parameters of regular canola meal (CM) and CM + PMS after 24 h of in situ incubation

| | Treatments[1] | |
|---|---|---|
| Item | CM | CM + PMS |
| DM digestibility | 70.8% | 72.1% |
| CP digestibility | 68.3% | 70.6% |

[1]Treatments included regular canola meal (CM), CM blended with 1.5% (DM basis) pea molasses (CM + PMS)

Example 3: Feedlot Trial

Materials and Methods:

The study was designed as a 4×4 Latin square. Four ruminally cannulated beef heifers were fed prescribed diets described in Table 4 for four periods of 25 d each. For each period, the first 7 d were the adaptation period, and days 8-12 were the voluntary intake period. Days 13-16 were used for the measurement of rumen pH using indwelling pH probes. On day 16, rumen fluid was collected every 3 hours over 24 hours. From day 17 until the end of each period, cattle were feed-restricted to 95% of the voluntary intake to ensure the consumption of all feed. On day 20, urinary catheters were inserted, and the total collection of urine and feces was carried out from day 20-25. Heifers were fed twice daily for the entire experiment, and orts were collected daily before feeding. Heifers were fed for ad libitum intake during the study except for the total collection period, when they were fed 95% of the voluntary intake to ensure the complete consumption of the feed. Diets were sampled daily during total collection and composited for chemical analysis.

TABLE 4

Ingredient and chemical composition of the experimental diets used for the evaluation of the inclusion of PMS for growing beef cattle during backgrounding

| | Treatments[1] | |
|---|---|---|
| Item | CM | CM + PMS |
| Diet composition (% DM basis) | | |
| Grass hay | 61.7 | 61.3 |
| Corn grain | 24.6 | 24.7 |
| CM | 9.8 | 9.8 |
| PMS | — | 0.14 |
| Supplement | 3.9 | 4.1 |
| Backgrounding diets nutrient composition (n = 4; % DM basis) | | |
| OM | 92.2 | 92.4 |
| CP | 11.9 | 11.9 |
| EE | 3.09 | 2.96 |
| ADF | 24.8 | 26.0 |
| NDF | 42.5 | 44.3 |
| Starch | 20.6 | 20.5 |
| Ash | 7.83 | 7.56 |

[1]Treatments included CM, diets containing regular CM, CM + PMS, diets containing 1.5% (DM basis) inclusion of pea molasses in CM

TABLE 5

Ingredient and chemical composition of the experimental diets used for the evaluation of the inclusion of PMS in the diets of beef steers during finishing and cannulated beef heifers during the metabolism study

| | Treatments[1] | |
|---|---|---|
| Item | CM | CM + PMS |
| Diet composition (% DM basis) | | |
| Grass hay | 8.8 | 8.7 |
| Corn grain | 77.2 | 77.3 |
| CM | 10.0 | 9.9 |
| PMS | — | 0.14 |
| Supplement | 4.0 | 4.0 |
| Backgrounding diets nutrient composition (n = 4; % DM basis) | | |
| OM | 94.6 | 94.7 |
| CP | 14.1 | 14.2 |
| EE | 4.18 | 4.31 |
| ADF | 14.5 | 13.2 |
| NDF | 26.6 | 24.0 |
| Starch | 38.1 | 40.1 |
| Ash | 5.40 | 5.28 |

[1]Treatments included CM, diets containing regular CM, CM + PMS, diets containing 1.5% (DM basis) inclusion of pea molasses in CM Diets were formulated to meet or exceed the National Academies of Sciences, Engineering, and Medicine (NASEM 2016) requirements for CP, energy, minerals, and fat-soluble vitamins for growing and finishing beef heifers. Monensin sodium was provided to achieve 20-30 mg kg-1 (DM) in the final diet and was included in the vitamin-mineral pellet. The calcium:phosphorus ratio (Ca:P) was formulated to range from 1.5:1 to 2:1.

Rumen pH was measured using an in-dwelling rumen pH system (Dascor, Escondido, CA, USA) as described by Penner et al. (2006). Probes were standardized using buffers (pH 4 and 7). The system measured rumen pH every minute for 72 h starting at 0800 on d 13 of each period. After 72 h, the probes were removed from the rumen, washed, and data downloaded. The mV data was converted to pH data using the calculated slope and y-intercept values determined during calibration. The pH data was averaged by min, and the mean, maximum, and minimum values were determined for each heifer. The duration (min d−1) and area (min d−1×pH) under pH 5.8, 5.5, and 5.2 were also determined. The rumen environment was categorized based on pH as mildly acidotic (pH 5.8-5.5), moderately acidotic (pH 5.5-5.2), or severely acidotic (pH<5.2). Rumen fluid samples were collected every three hours over a 24-hour period on day 16 of each period from 3 locations within the rumen by straining the rumen contents through 4 layers of cheesecloth. The pH of rumen fluid was determined immediately after rumen fluid collection using a portable pH meter.

Rumen fluid was collected from all five heifers at 3-h intervals for 24 h starting at 0800 on d 16 of each period. About 250 mL of rumen fluid from four different regions of the rumen (ventral, anterior, posterior sacs, and rumen mat) was collected and strained through two layers of cheesecloth.

Results:

TABLE 6

Effect of inclusion of food industry by-products in the finishing diets on ruminal pH of beef heifers Treatments 1

| Item | CM | CM + PMS | SEM[2] | P-value |
|---|---|---|---|---|
| Spot rumen pH | 6.02 | 6.21 | 0.189 | 0.70 |
| Rumen pH parameters using indwelling pH probes | | | | |
| Mean daily rumen pH | 5.89 | 6.02 | 0.418 | 0.95 |
| Minimum rumen pH | 4.94 | 4.92 | 0.160 | 0.07 |
| Maximum rumen pH | 6.49 | 6.93 | 0.223 | 0.33 |
| Rumen pH parameters 5.8 or lower (mild acidosis) | | | | |
| Total duration (min d-1) | 932.7 | 843.3 | 257.34 | 0.73 |
| pH area (pH × min) | 464.1 | 488 | 204.00 | 0.92 |
| Rumen pH parameters 5.5 or lower (moderate acidosis) | | | | |
| Total duration (min d-1) | 672.4 | 689.9 | 275.4 | 0.88 |
| pH area (pH × min) | 220.4 | 255.8 | 128.7 | 0.95 |
| Rumen pH parameters 5.2 or lower (severe acidosis) | | | | |
| Total duration (min d-1) | 328.7 | 472.9 | 248.14 | 0.95 |
| pH area (pH × min) | 74.2 | 79.8 | 51.90 | 0.96 |

[1]Treatments included CM, diets containing regular CM, CM + PMS, diets containing 1.5% (DM basis) inclusion of pea molasses in CM
[2]SEM, pooled standard error of mean, n = 4 heifers.

Spot and indwelling mean rumen pH values were numerically greater for heifers fed CM+PMS than those fed CM. Rumen pH values greater than 6 typically indicate a healthy rumen environment, as prolonged periods of rumen pH≤5.8 may lead to the development of subacute ruminal acidosis. Moreover, the maximum rumen pH recorded was also relatively greater for heifers fed CM+PMS than those fed CM.

What is claimed is:

1. A method of improving crude protein digestibility in a ruminant animal comprising adding an animal feed additive to the feed of the ruminant animal wherein the animal feed additive consists of 98.5% canola meal (db, w/w) and 1.5% pea solubles (db, w/w), wherein the pea solubles are obtained by a method consisting of:
   a. treating milled pea flour under alkaline conditions to solubilize a protein fraction;
   b. separating the protein fraction from a starch rich pellet using a solid-liquid separation method;
   c. precipitating the protein from the protein fraction by isoelectric precipitation to generate a protein rich pellet;
   d. separating the protein rich pellet from the protein fraction to obtain pea solubles (<5% solids); and
   e. concentrating the pea solubles by filtration or evaporation to a minimum solid content of 45%, weight to volume (w/v).

2. The method of claim 1, wherein the ruminant animal is a cattle chosen from cows, bulls, heifers and steers.

3. A method of increasing the rumen pH in a ruminant animal comprising adding an animal feed additive to the feed of the ruminant animal wherein the animal feed additive consists of 98.5% canola meal (db, w/w) and 1.5% pea solubles (db, w/w), wherein the pea solubles are obtained by a method consisting of:
   a. treating milled pea flour under alkaline conditions to solubilize a protein fraction;
   b. separating the protein fraction from a starch rich pellet using a solid-liquid separation method;
   c. precipitating the protein from the protein fraction by isoelectric precipitation to generate a protein rich pellet
   d. separating the protein rich pellet from the protein fraction to obtain pea solubles (<5% solids); and
   e. concentrating the pea solubles by filtration or evaporation to a minimum solid content of 45%, weight to volume (w/v).

4. The method of claim 3, wherein the ruminant animal is a cattle chosen from cows, bulls, heifers and steers.

5. A method of increasing the usable nutrients for a ruminant animal fed canola meal comprising adding an animal feed additive to the feed of the ruminant animal wherein the animal feed additive consists of 98.5% canola meal (db, w/w) and 1.5% pea solubles (db, w/w), wherein the pea solubles are obtained by a method consisting of:
   a. treating milled pea flour under alkaline conditions to solubilize a protein fraction;
   b. separating the protein fraction from a starch rich pellet using a solid-liquid separation method;
   c. precipitating the protein from the protein fraction by isoelectric precipitation to generate a protein rich pellet;
   d. separating the protein rich pellet from the protein fraction to obtain pea solubles (<5% solids); and
   e. concentrating the pea solubles by filtration or evaporation to a minimum solid content of 45%, weight to volume (w/v).

6. The method of claim 5, wherein the canola meal is added to the feed of said animal.

7. The method of claim 6, wherein the canola meal is in the form of an animal feed additive.

* * * * *